United States Patent [19]

Breda

[11] Patent Number: 5,275,195

[45] Date of Patent: Jan. 4, 1994

[54] VALVE CARTRIDGE AND SEAL THEREFOR

[75] Inventor: Silvano Breda, 125 Limestone Crescent, Downsview, Ontario, Canada, M3J 2H1

[73] Assignee: Silvano Breda, Downsview, Canada

[21] Appl. No.: 812,012

[22] Filed: Dec. 23, 1991

[30] Foreign Application Priority Data

Dec. 9, 1991 [CA] Canada .................................. 2057258

[51] Int. Cl.⁵ .................... F16K 11/076; G05D 11/03
[52] U.S. Cl. .............................. 137/100; 137/625.17; 137/636.4
[58] Field of Search .............. 137/100, 625.17, 625.19, 137/636.4

[56] References Cited

U.S. PATENT DOCUMENTS

| | | | |
|---|---|---|---|
| Re. 25,920 | 11/1965 | Moen ................... | 137/454.2 |
| 2,308,127 | 1/1943 | Symmons ................ | 137/100 X |
| 3,202,181 | 8/1965 | West ..................... | 137/625.17 |
| 3,204,656 | 9/1965 | Moen .................... | 137/625.17 X |
| 3,285,278 | 11/1966 | Corlett ................. | 137/625.17 X |
| 3,448,755 | 6/1969 | Symmons ............... | 137/100 |
| 3,726,317 | 4/1973 | Moen .................... | 137/625.17 |
| 3,730,222 | 5/1973 | Moen .................... | 137/625.17 |
| 3,840,048 | 10/1974 | Moen .................... | 137/625.41 |
| 3,916,950 | 11/1975 | Mongerson et al. ........ | 137/625.41 |
| 3,960,016 | 6/1976 | Symmons ................ | 73/343 R |
| 4,033,370 | 7/1977 | Egli ...................... | 137/100 |
| 4,183,376 | 1/1980 | Moen .................... | 137/625.17 X |
| 4,330,011 | 5/1982 | Moen .................... | 137/625.17 |
| 4,395,018 | 7/1983 | Moen .................... | 251/310 |
| 4,469,121 | 9/1984 | Moen .................... | 137/100 |
| 4,495,969 | 1/1985 | Givler ................... | 137/625.17 |
| 4,653,535 | 3/1987 | Bergmann ............... | 137/625.17 |
| 4,917,137 | 4/1990 | Symmons ................ | 137/98 |
| 4,979,530 | 12/1990 | Breda .................... | 137/100 |

FOREIGN PATENT DOCUMENTS

943523 3/1974 Canada .
1052229 4/1979 Canada .

*Primary Examiner*—John Rivell
*Attorney, Agent, or Firm*—Neil H. Hughes; Ivor M. Hughes

[57] ABSTRACT

A compound seal is provided for a valve having a housing, the housing having cold and hot water inlets and at least one outlet. The housing contains a replaceable cartridge having a valve actuation portion having cold and hot water inlets and outlets to allow fluid to interruptibly flow through the valve. The flow is interrupted when the valve actuation portion is moved from a valve open position to a valve closed position. The seal includes a body having first sealing elements to interrupt the flow through the inlet of the valve when the valve actuation portion is moved from a valve open position to a valve closed position. The body of the seal also has second sealing elements to interrupt the flow out of the valve through the outlet thereof when the valve actuation portion is moved from a valve open position to a valve closed position should the first sealing element fail.

23 Claims, 5 Drawing Sheets

VALVE CARTRIDGE AND SEAL THEREFOR

FIELD OF INVENTION

This invention relates to valves used in situations where both volume and mixing is required. More specifically, this invention finds application to shower, kitchen, or lavatory valves.

BACKGROUND OF THE INVENTION

A large number of cartridge valves are found in the prior art. Some of these valves are reciprocal type valves for adjustment of volume. Other valves are mixing valves which mix a preset volume of hot and cold water together which leaves the fluid exiting the valve at a desired temperature. Further, other valves combine both functions being reciprocating valves and temperature adjustable valves.

Some of the aforementioned valves include a pressure balancing spool therein to compensate for a change in the pressure of either the hot or the cold water feed lines. This structure is known in the art and may be embodied in either a mixing valve, in a reciprocal valve, or in combinations thereof.

Examples of valves which are reciprocal and rotatable are found in U.S. Pat. No. Re. 25,920 to Moen, U.S. Pat. No. 4,330,011 Moen, U.S. Pat. No. 3,730,222 to Moen which patents describe various forms of cartridges which may be used with a single lever valve. Alternatively, U.S. Pat. No. 4,469,121 to Moen describes the use of a pressure balancing spool in a cycle valve which is non-reciprocating and has no provision for volume control.

U.S. Pat. No. 4,033,370 to Egli teaches a mixing valve for control of water temperature and pressure as well as the volume of the water discharged from the valve. A pressure balancing spool is incorporated with the valve which spool includes a rubber sleeve such as best seen in FIG. 4 which has fins and ribs which extend outwardly away from the spool portion and provide a seal against an adjacent surface.

U.S. Pat. No. 2,308,127 to Symmons describes a non-scald mixing valve which is reciprocal and also rotatable in a valve housing, and includes a pressure balancing member within a hollow in the center of the valve which compensates for the changes in pressure in either the hot or the cold water lines. U.S. Pat. No. 3,448,755 further describes a valve by Symmons with an improved volume control. U.S. Pat. Nos. 3,960,016 and 4,917,137 further describe improvements to his pressure balancing concept.

Alternative types of sealing have been provided for these cartridges in order to minimize the effect of the grit found in the hot water stream, in particular, which may cut the seal if the seal were left in the direct path of the water flow. U.S. Pat. No. 4,395,018 describes such a seal which seal is positioned on a sleeve out of the path of flow with the stem outlet port being closed by the seal member when the valve is in a closed position. The seal is a generally well known seal of the "O" Ring type.

Canadian Patent 1,052,229 to Moen describes a flexible rubber sleeve located between a movable valve member and a stationary sleeve, which rubber sleeve is positioned within the valve sleeve at a location to mask sleeve inlet ports 38 and 40 as described in the specification. This sleeve partially collapses in a operation which will permit water to flow toward the sleeve outlets. It is interesting to note that the outlets are actually beyond the flexible sleeve which is best seen in FIG. 3 of the figures thereof.

The following references describe a body sealing member which seals the inlet of the stationary sleeve in relation to the movable sleeve only. No discussion of sealing the outlet in these references is found. These references therefore are: U.S. Pat. No. 4,495,969 to Givler, U.S. Pat. No. 3,726,317 to Moen, U.S. Pat. No. 3,916,950 to Mongerson, U.S. Pat. No. 3,840,048 to Moen, Canadian Patent 943,523 to Mongerson and Moen. However, these references teach only a body portion forming a seal only at the inlet of the valve and nowhere is there described the advantages of sealing the outlet as well should the inlet seal of the body portion fail.

It is also known in the art to provide separate check valves upstream of a valve assembly to prevent the backflow of waste effluent through an outlet of a valve into a valve to contaminate the the fluid streams. The present invention provides a seal on the outlet of a valve assembly which also provides a check to prevent backflow of waste into the valve assembly.

Nowhere within the prior art is there found a cartridge for a kitchen, lavatory, or shower valve which cartridge may include a pressure balancing spool, an internal mixing chamber, or a separation of the water paths, all of which cartridges may be placed in a standardized housing. Should the user of the valve desire to replace a standard valve which has a mixing chamber therein with a pressure balancing spool contained within a similarly sized cartridge, he or she merely replaces the cartridge and the installation is complete. Therefore, there will be no requirement for removing the old housing and the necessary repairs to the adjacent area of the valve. Further this valve incorporates a unique seal unknown in the prior art which seal is formed as a body having sealing portions located adjacent both the inlet and the outlet of the valve so that should the inlet portion fail, the outlet portion will maintain a seal in the valve which also provides a check to prevent backflow of waste into the valve assembly.

It is therefore a primary object of this invention to provide a standardized cartridge for a valve housing which offers the advantage of replacing a valve cartridge of one function with a valve cartridge with enhanced functions.

It is a further object of this invention to provide a valve cartridge containing a unique seal which seals both the inlet and the outlet of the valve cartridge.

It is yet a further object of this invention to provide the structure of a unique seal which seals both the inlet and the outlet of a valve.

It is yet a further object of this invention to provide the structure of a unique seal which also provides a check to prevent backflow of waste into the valve assembly.

Further and other objects of this invention will become apparent to a man skilled in the art when considering the following summary of the invention and detailed description of the preferred embodiments of the invention illustrated herein.

SUMMARY OF THE INVENTION

According to one aspect of the invention there is provided a valve cartridge for a valve housing, the housing having an opening therein for receiving the cartridge in use and an inner wall surrounding the opening, the inner wall of the housing having fluid ports defined therewith to provide a fluid path to and from the valve cartridge in use, the valve cartridge comprising an outer substantially hollow stationary sleeve having an inner and outer surface, and an inner substantially hollow moveable sleeve disposed within the stationary sleeve also having an inner and outer surface and having inlets and outlets, (preferably said hollow of said moveable sleeve containing: a pressure balancing spool, a plug to maintain separate fluid paths through the cartridge, or if required a mixing chamber to mix different fluids together in use), the stationary sleeve having a first inlet, a first outlet and means to carry an outlet sealing portion (preferably an opening), preferably the outlet and the means being disposed adjacent one another and preferably when the means is an opening together substantially resembling a figure eight; proximate the first inlet, the first outlet and the means to carry an outlet sealing portion is disposed a seal being preferably generally cylindrical in form and including proximate the inlet, outlet and the means to carry an outlet sealing portion of the stationary sleeve first annular raised portions raised laterally toward the moveable sleeve through the stationary sleeve and abutting the outer surface of the moveable sleeve in use, the seal having second annular raised portions opposite the first portions raised laterally away from the stationary sleeve in use and abutting the housing, the portion of the seal proximate the first inlet and outlet having an aperture therethrough in alignment with the first inlet and outlet of the stationary sleeve, the portion of the seal proximate the means to carry an outlet sealing portion having an occluded face therewith presenting a sealing surface for selective alignment with an outlet of the moveable sleeve in use, whereby when the moveable sleeve is moved (preferably either by reciprocation and/or rotation) between the valve closed position, whereat the portion of the seal proximate the inlet of the stationary sleeve abuts the outer wall of the moveable sleeve thus preventing fluid from entering the cartridge and whereat the portion of the seal proximate the means to carry an outlet sealing portion of the stationary sleeve abuts the outlet of the moveable sleeve proximate the outer wall by the raised portion and occluded face of said portion thus preventing fluid from exiting the cartridge should the seal proximate the inlet of the stationary sleeve fail, to selective valve opened positions whereat the aperture of the portion of the seal proximate the inlet and outlet of the stationary sleeve overlaps all or part of the inlet and outlet of the moveable sleeve, the raised portions abutting the outer wall of the moveable sleeve proximate the inlet and outlet of the moveable sleeve thus allowing fluid to enter and exit the cartridge and whereat the portion of the seal proximate the means to carry an outlet sealing portion of the stationary sleeve has moved partially or totally away from the outlet of the moveable sleeve with the raised portion and occluded face of said portion allowing fluid to exit the cartridge, the laterally raised portions of the seal abutting the housing assisting in the retention of the seal with the stationary sleeve, and preferably providing a further backup seal for the outlet of the housing when the valve is in the closed position should the raised portions proximate the inlet and outlet of the moveable sleeve fail in use.

In a preferred embodiment the occluded face of the outlet sealing portion provides a check means to prevent the backflow of waste effluent through the outlet of the valve. Preferably the laterally raised portions (or the like) extending to the housing provide a check means to prevent the backflow of waste effluent through the outlet of the valve and complement the action of the occluded face of the outlet sealing portion as a check means.

According to yet another aspect of the invention there is provided a compound seal for a valve having a housing, the housing having inlet means and outlet means, the housing containing valve actuation means therein having inlet means and outlet means to allow fluid to interruptibly flow through the valve, the flow being interrupted when the valve actuation means is moved from a valve open position to a valve closed position, the seal comprising a body, preferably of substantially cylindrical form, the body having disposed therewith first sealing means to interrupt the flow through the inlet of the valve means when the valve actuation means is moved from a valve open position to a valve closed position, the body also having disposed therewith second seal means to interrupt the flow out of the valve means through the outlet thereof when the valve actuation means is moved from a valve open position to a valve closed position should the first sealing means fail. In a preferred embodiment the body of the seal has engagement means disposed therewith proximate the housing to ensure that the body is held in position in use, (preferably the engagement means being raised annular portions preferably surrounding the first and second sealing means proximate the housing). In a preferred embodiment the seal body may further comprise third sealing means to interrupt the flow from the valve means through the outlet of the housing when the valve actuation means is moved from a valve open position to a valve closed position should the first sealing means and the second sealing means fail.

In a preferred embodiment the occluded face of the outlet sealing portion provides a check means to prevent the backflow of waste effluent through the outlet of the valve. Preferably the laterally raised portions (or the like) extending to the housing provide a check means to prevent the backflow of waste effluent through the outlet of the valve and complement the action of the occluded face of the outlet sealing portion as a check means.

According to yet another aspect of the invention there is provided a compound seal for a valve having a housing, the housing having cold and hot water inlets and at least one outlet (in one embodiment the housing may contain a mixing chamber proximate the at least one outlet if one is not otherwise provided), the housing containing a replaceable cartridge having valve actuation means therein (preferably said valve actuation means of said cartridge being a moveable sleeve having an outer wall and disposed within an outer stationary sleeve fixed in position in the housing), the valve actuation means having cold and hot water inlets and outlet means to allow fluid to interruptibly flow through the valve, (in one embodiment the outlet means may be distinct cold and hot water outlets and in another embodiment the outlet means may be at least one outlet for mixed water), the flow being interrupted when the valve actuation means is moved from a valve open position to a valve closed position, the seal comprising a body, preferably of substantially cylindrical form, the body having disposed therewith first sealing means (preferably a raised annular portion extending about an opening through the body preferably for engagement with the valve actuation means and preferably the outer wall of the moveable sleeve) to interrupt the flow through the inlet of the valve means when the valve actuation means is moved from a valve open position to a valve closed position, the body also having disposed therewith second seal means (preferably the body having an interior wall and a raised annular portion extending about an opening through the body proximate the interior wall thus allowing flow through the valve, the raised annular portion being disposed adjacent a second raised annular portion proximate the interior wall of the body, the second portion surrounding an occluded face for engagement with the outlet means of the valve actuation means and preferably of the moveable sleeve) to interrupt the flow out of the valve means through the outlet thereof when the valve actuation means is moved from a valve open position to a valve closed position should the first sealing means fail. In a preferred embodiment the body of the seal has engagement means disposed therewith proximate the housing to ensure that the body is held in position in use, (preferably the engagement means being raised annular portions preferably surrounding the first and second sealing means proximate the housing). In a preferred embodiment the seal body may further comprise third sealing means to interrupt the flow from the valve means through the outlet of the housing when the valve actuation means is moved from a valve open position to a valve closed position should the first sealing means and the second sealing means fail. In a preferred embodiment the occluded face of the outlet sealing means provides a check means to prevent the backflow of waste effluent through the outlet of the valve. Preferably the laterally raised portions (or the like) extending to the housing provide a check means to prevent the backflow of waste effluent through the outlet of the valve and complement the action of the occluded face of the outlet sealing means as a check means.

Further this valve incorporates a unique seal unknown in the prior art which seal is formed as a body having sealing portions located adjacent both the inlet and the outlet of the valve so that should the inlet portion fail, the outlet portion will maintain a seal in the valve. In a preferred embodiment the outlet sealing portion provides a check means to prevent the backflow of waste effluent through the outlet of the valve. Preferably laterally raised portions (or the like) extend to a valve housing and provide a check means to prevent the backflow of waste effluent through the outlet of the valve and complement the action of the outlet sealing portions as a check means.

BRIEF DESCRIPTION OF THE DRAWINGS

The invention will now be illustrated with respect to the following drawings illustrating embodiments of the invention in which.

DETAILED DESCRIPTION OF PREFERRED EMBODIMENTS OF THE INVENTION

The instant invention provides a standard housing 20 for a kitchen, lavatory, and shower and tub valve. Within the valve 10, there may be included, a mixing chamber separate from the housing 20, a plug separating the integrity of the hot and cold water, or a pressure balancing spool when the valve is used in a shower and tub. Therefore, the cartridge containing these different features, will fit into the same housing. For example, if a valve having a mixing chamber within the cartridge were installed for a shower and the users wish to include a pressure balancing function, it would be simple to remove the handle of the valve and replace the used cartridge with the new cartridge containing the pressure balancing spool. No plumbing is therefore required and no repairs are needed to the area surrounding the valve.

Further, by providing a seal proximate the outlet of the valve, the instant invention provides a more reliable cartridge since should the seal proximate the inlet fail, the sealing face which is occluded proximate the outlet provides a positive shut-off for the valve.

Figure 1:
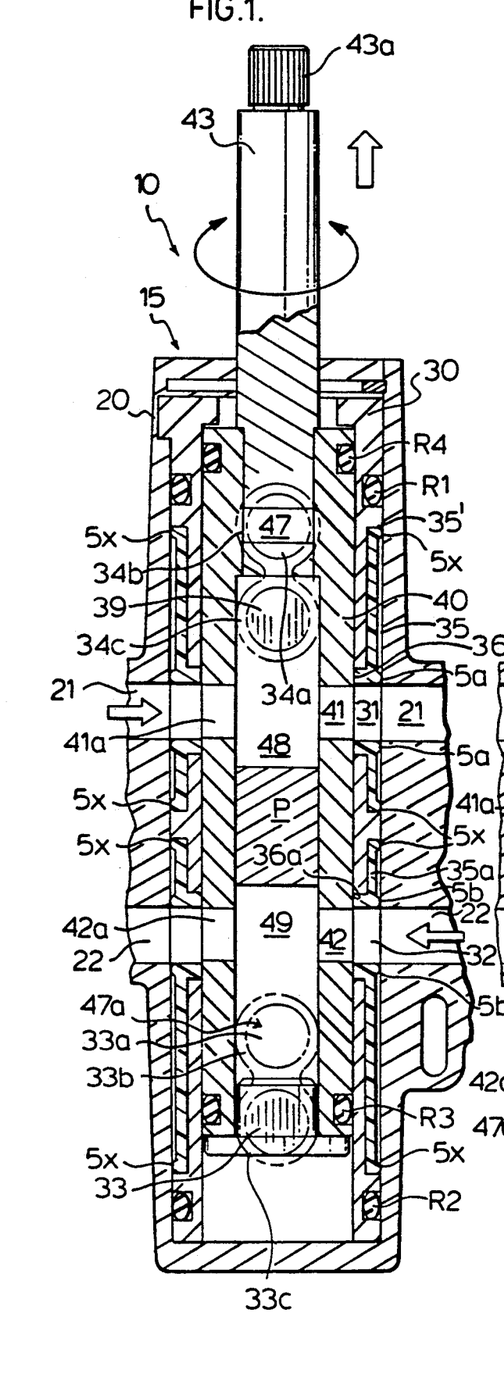
FIG. 1 and FIG. 2 are cross-sectional side views of the components of the valve cartridge illustrating the on and the off positions in a preferred embodiment of the invention.

Referring now to FIG. 1, there is provided a valve 10 having a housing 20 installed in a manner as known in the art. The housing 20 includes a top and bottom and has an opening extending from proximate the top to proximate the bottom within which a cartridge 15 is located. The cartridge 15 is formed from an outer stationary sleeve 30 which has a recess or region 35' disposed therewith within which a generally cylindrical seal body 35 is disposed. The stationary sleeve 30 therefore anchors the sealing sleeve 35 therewith wherein portions 5x are provided which extend laterally from the seal 35 towards the housing 20. These portions 5x assure the retention of the seal 35 in the space 35' within the stationary sleeve 30. "O" Rings R1 and R2 are disposed proximate the top and bottom of the stationary sleeve 30 as is known in the art.

The cylindrical seal body 35 includes sealing portions 36 which extend through an opening 31 through the stationary sleeve 30 and abut the outer surface of the movable sleeve 40 disposed within the stationary sleeve 30. The sealing portions 36 in effect provide an inlet seal against the outer surface of the movable sleeve 40 when the inlets 31 and 41 of the stationary and movable sleeve are not aligned.

The movable sleeve 40 is therefore rotatable and reciprocal in the stationary sleeve 30 as is known in the art. In rotating and reciprocating the movable sleeve 40 the inlets 31, 32 of the stationary sleeve and the inlets 41, 42 of the movable stationary sleeve are brought in and out of alignment to open and close the water path through the valve. Further the sealing portions 36 and 39 are brought in and out of alignment with the inlets 41, 42 and outlets 47 and 47a of the movable sleeve.

Figure 2:
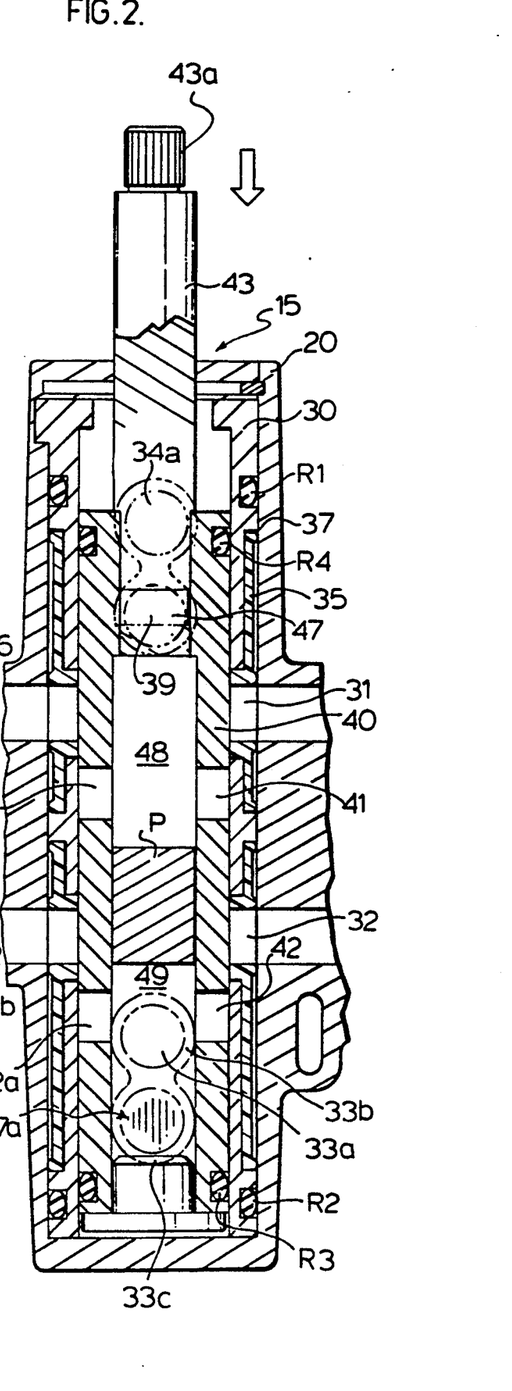
Figure 4:
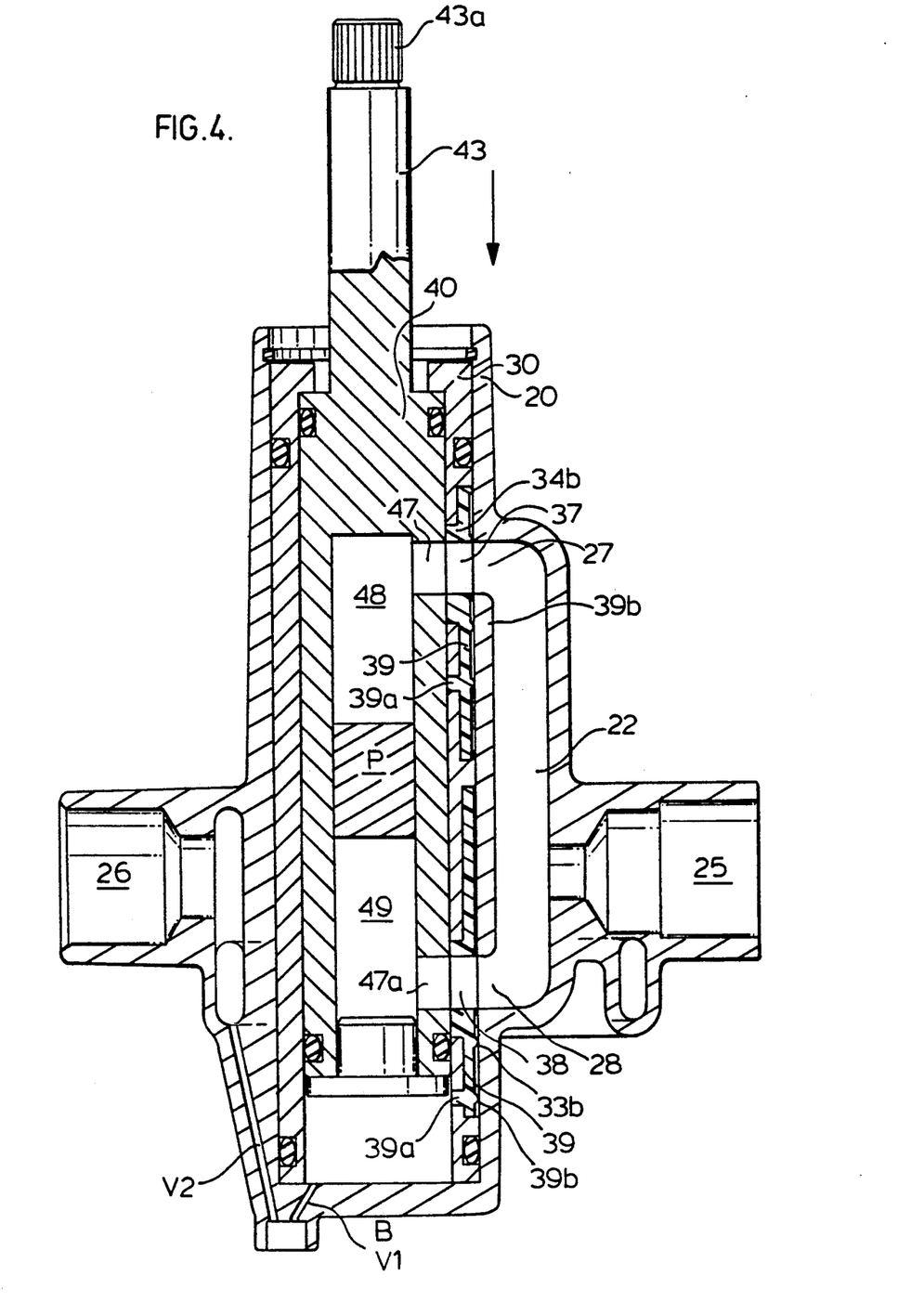
FIG. 4 is a cut-away perspective view of the valve of FIG. 1 in a vertical axis normal to the vertical cross-section shown in FIG. 1 illustrating the unique sealing of the outlets thereof and illustrated in a preferred embodiment of the invention.

As is the case with the movable sleeve 40 of FIGS. 1 and 2, there is provided in FIG. 4 hollow interior portions 48 and 49 which are separated by a plug P. The water therefore flows through the respective openings, when aligned, 21 of the housing, 31 of the stationary spool, and 41 of the movable spool to enter the hollow 48 within the cartridge 15. The water will also flow through the openings 22, 32, 42, and 49 in a similar manner.

When aligned, therefore, the water will flow through the outlet of the movable cartridge as best seen in FIG. 4 from the chambers 48 and 49 respectively through the outlet, 47 and 47a of the movable spool, 37 of the stationary spool proximate the sealing sleeve 35, and through the outlet 27 in the housing which provides a mixing chamber 22. Therefore, when the outlets are in proper alignment as best seen in FIG. 4, the water will flow through the openings 37, and 38 around the annular sealing portions 34b of the ceiling body 35 through the opening 34a and 33a of the seal 35. The mixing chamber 22 will allow for the mixing of the fluid prior to the water exiting the valve through either 25 or 26 to the shower or tub. Vents V1 and V2 are provided proximate the bottom of the valve to vent the valve to atmosphere as is known in the art.

One of the many benefits of the structure of such a valve is that the provision of the occluded face 39 of the outlet sealing portion 39a provides a check mechanism to prevent the backflow of waste effluent through the outlet of the valve 25. Further the laterally raised portions 34b and 39b extending to the housing 20 provide a check mechanism to prevent the backflow of waste effluent through the outlet 27, 37, and 47 or 28, 38, and 47a of the valve and complement the action of the occluded face 39 of the outlet sealing portion 39a as a check mechanism.

As previously described and as shown in FIG. 2, when the movable sleeve 40 of FIG. 1 is moved downwardly or reciprocated to a shut-off position in relation to seal body 35, the sealing face 39 is positioned to block the outlet 47 of the movable sleeve and provide a positive shut-off by presenting to the outlet 47 the occluded face 39 with the laterally extending rim about it 39a. Therefore no water can escape through the outlets 37, and 38 even if the inlet seal 36 proximate the opening 31 in FIG. 2 should fail and allow water to bypass the seal through inlet 41, the occluded face 39 will provide a positive shut-off against the outlets 47 and 48 respectively and prevent fluid from exiting the stationary sleeve at 37, and 38.

Figures 7, 8:
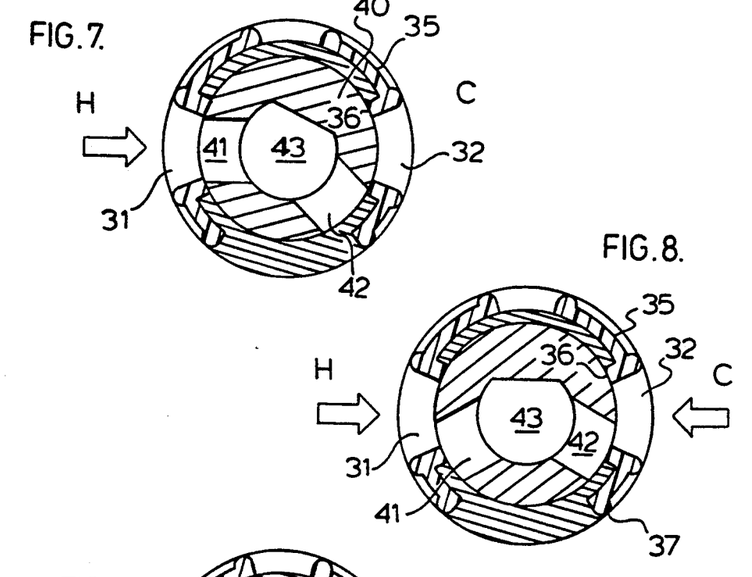
FIGS. 7, 8, and 9 are top schematic views of the cartridges of FIG. 1 and 2 illustrating the fluid path through the valve in various hot and cold water positions illustrated in preferred embodiments of the invention.
Figure 9:
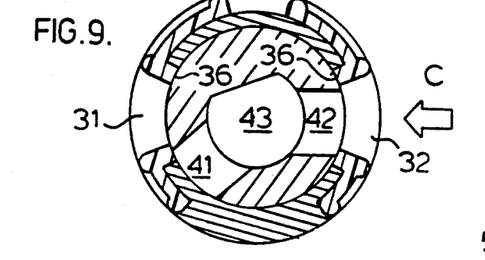

Therefore, when the stem 43 of the movable cartridge 40 is moved the direction of the arrow of FIG. 1, the valve is opened wherein a portion of the inlet 41 will align with the inlet 31 as best seen in FIG. 7, 8, and 9. It may be seen from these figures that the movable sleeve can be rotated in the direction shown in FIG. 1 to allow the separate hot and cold water streams to selectively enter the valve by the rotation of the stem portion 43 to selectively align the openings 31, 41, 32 and 42. As is seen in FIG. 7, the water will enter through opening 31 of the stationary sleeve in 100% alignment with the opening 41 of the movable sleeve while openings 32 and 42 are not aligned but are sealed by the sealing portion 36 of the generally cylindrical seal body 35. As best seen in FIG. 8 continued rotation of the sleeve 40 allows for the passage of fluid into the valve through opening 32, 42 while the opening 31 is reduced in effective diameter and a mix of the two fluids will be achieved. Continued rotation of the movable member results in the seal 36 sealing the opening 31 against the opening 41 while the fluid path through openings 32 and 42 is substantially fully opened, as seen in FIG. 9.

Figure 5:
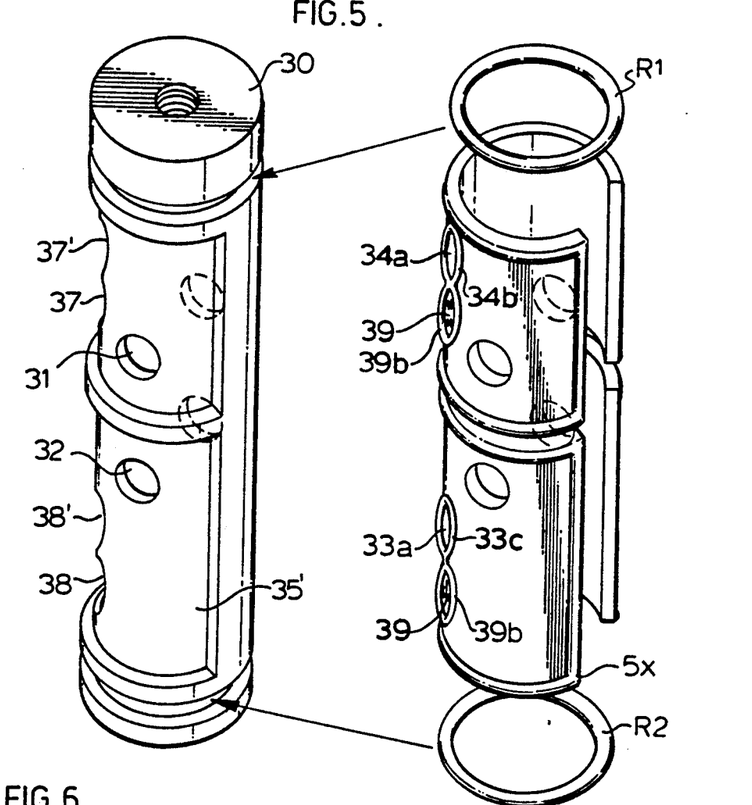
FIG. 5 is a partially exploded perspective view of the stationary sleeve and the body seal attached to the sleeve in use illustrated in a preferred embodiment of the invention.
Figure 6:
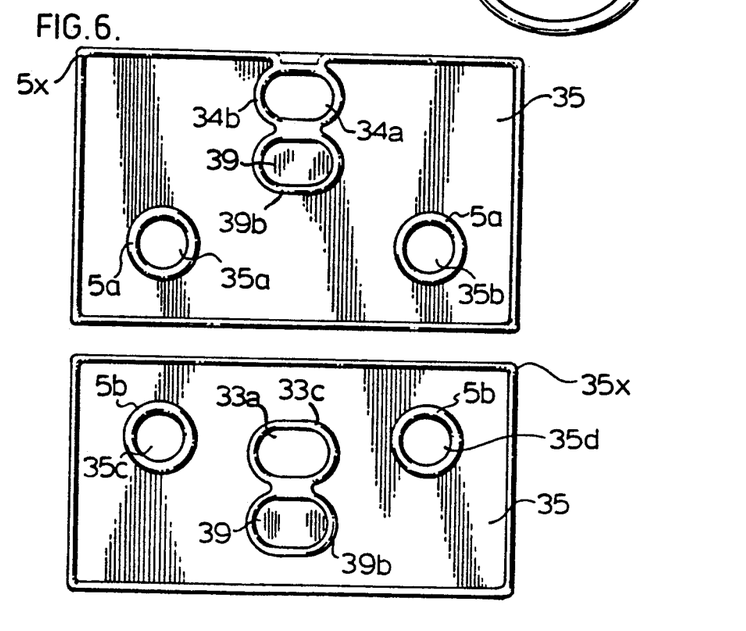
FIG. 6 is a schematic view of the seals of FIG. 5 illustrated in a preferred embodiment of the invention.

Referring to FIGS. 5 and 6, there is illustrated the stationary sleeve 30 having the space 35' provided having a perimeter within which the generally cylindrical seals 35 are carried in use. The seals include openings 35a and 35b which co-relate with openings 31 in the top portion of the stationary sleeve 30. Likewise the seal proximate the lower area of 35' includes openings 35c and 35d located proximate the openings 32 of the lower portion of the stationary sleeve when water passes through the valve. Otherwise the sealing portions 36 abut through the openings 31 and 32 and engage the exterior of the movable sleeve 40 as best seen in FIG. 1 and 2. The annular portions 5a and 5b located proximate the openings 35a, b, c and d respectively cooperate with the perimeter portions 5x, about the perimeter of the substantially cylindrical seals 35, and provide pressure to retain the seal body 35 in position, within the opening 35' of the stationary sleeve, and for the portion 36 to selectively abut the exterior surface of the movable sleeve 40. Occluded face 39 surrounded by annular wall 39a are provided proximate the outlet from the stationary sleeve 30 adjacent an opening 34a and 33a passing through the generally cylindrical body seal 35 and surrounded by an annular portion 33c and 34b respectively. The opening through the stationary sleeve 37 and 37', 38 and 38' therefore carry the opening 34a, 34a and the occluded face 39 within the body seal 35 substantially as shown.

Figure 10:
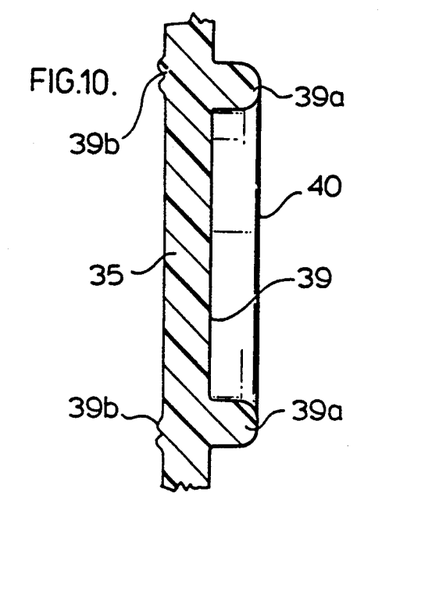
FIGS. 10 and 11 are cut-away cross-sectional views of the body seal of FIG. 5 illustrating the sealing portions adjacent the inlet and the outlet of the movable sleeve in the cartridge and illustrated in a preferred embodiment of the invention.
Figure 11:
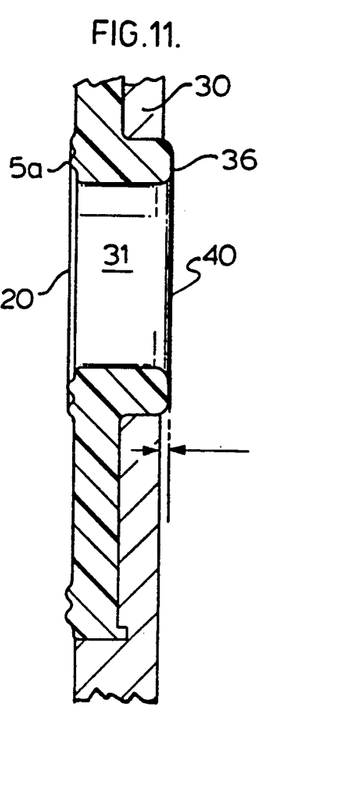

As best seen in FIG. 4 with the reciprocation and rotation of the movable sleeve 40, the outlets 47 and 47a will be raised and lowered with respect to the outlets 37 and 38 of the stationary sleeve 30 and the occluded face 39 of the seal body 35. FIGS. 10 and 11 illustrate the occluded face 39 with the laterally extending portions 39a abutting the movable sleeve 40 being pressed against the movable sleeve by the laterally raised portions 39b which engages the housing opposite the portion 39a and causes pressure to be exerted upon the sealing portion 39a. Likewise in FIG. 11 the sealing portion 36 engages the movable sleeve 40 by the pressure provided by annular opposite portion 5a adjacent the housing 20 to seal the flow of water through the inlet of the valve.

Figure 3:
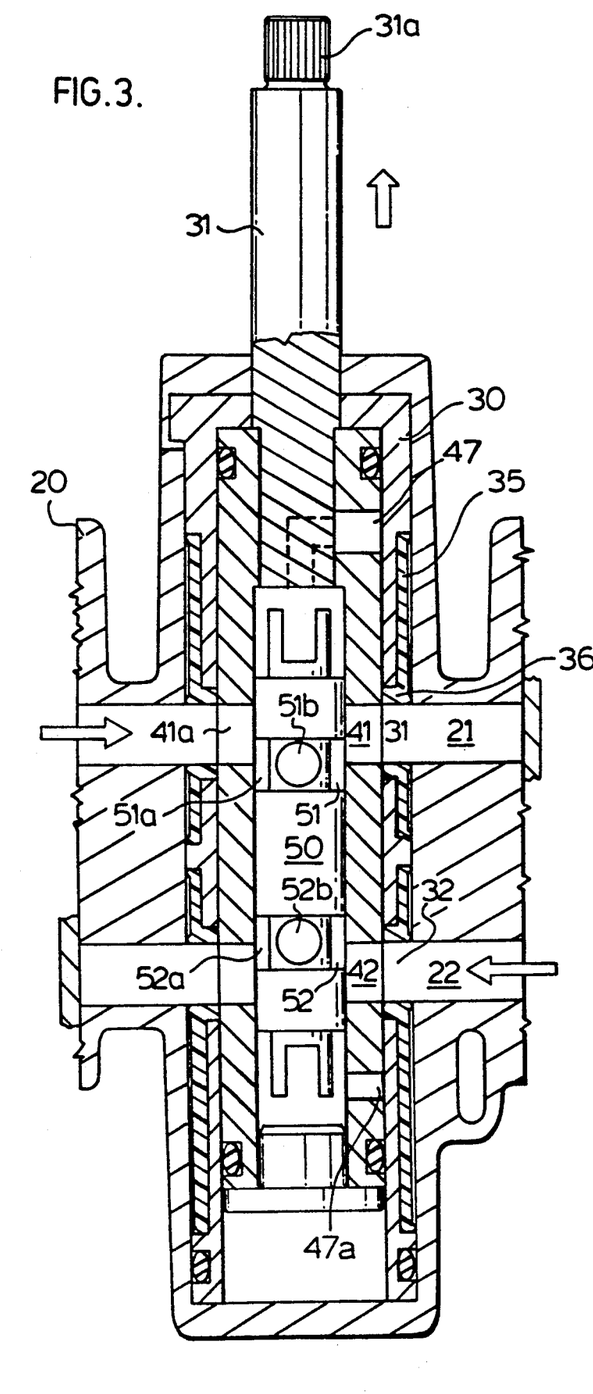
FIG. 3 is a cross-sectional side view of a similar valve to that of FIG. 1 incorporating a pressure balancing spool therewith and illustrated in a preferred embodiment of the invention.

Referring now to FIG. 3 there is provided the identical assembly as to FIGS. 1, 2, 4, and 5-11 with the exception that within the hollow 48, 49 instead of a plug being provided P, there is provided a pressure balancing spool 50 which is known in the art as described in the background of the invention specifically. The water flow, therefore, will enter through the openings 21, 31, 41, 51 or through 22, 32, 42, 52 and exit through 51b or 52b to the remainder of the valve as substantially shown in FIGS. 1 and 2. The pressure, therefore, will be compensated for should the requirement arrive.

Should therefore the pressure in line 22 increase, as is known, the shuttle 50 will move toward the opening 41 and thereby close off the effective diameter of opening 52 and increase the effective diameter of the opening 51. This pressure increase normally occurs when, for example, the cold water is used in a home, i.e. flushing the toilet, reducing the amount of cold water and the pressure thereof through the valve 10 resulting in the individual using the shower potentially receiving a nasty scald or being extremely uncomfortable at the least. By providing the shuttle, the effective opening 51 would be increased, assuming it is the cold water, as the pressure on the opening 52 is increased in relation to 51 causing the shuttle to move toward the direction of the opening 51 and thereby increase the size of the effective opening 51 in relation to the opening 41 allowing more cold water to pass into the valve. All other aspects of the valve remain unchanged.

As many changes can be made to the preferred embodiments of invention without departing from the scope of the invention; it is intended that all material contained herein be interpreted as illustrative of the invention and not in a limiting sense.

The embodiments of the invention in which an exclusive property or privilege is claimed are as follows:

1. A valve cartridge for a valve housing, the housing having an opening therein for receiving the cartridge in use and an inner wall surrounding the opening, the inner wall of the housing having fluid ports defined therewith to provide a fluid path to and from the valve cartridge in use, the valve cartridge comprising an outer substantially hollow stationary sleeve having an inner and outer surface, and an inner substantially hollow moveable sleeve disposed within the stationary sleeve also having an inner and outer surface and having inlets and outlets, the stationary sleeve having a first inlet, a first outlet and means to carry an outlet sealing portion; a seal is disposed proximate the first inlet, the first outlet and the means to carry an outlet sealing portion, and including proximate the inlet, outlet and the means to carry an outlet sealing portion of the stationary sleeve first annular raised portions raised laterally toward the moveable sleeve through the stationary sleeve and abutting the outer surface of the moveable sleeve in use, the seal having second annular raised portions opposite the first portions raised laterally away from the stationary sleeve in use and abutting the housing, the portion of the seal proximate the first inlet and outlet having an aperture therethrough in alignment with the first inlet and outlet of the stationary sleeve, the portion of the seal proximate the means to carry an outlet sealing portion having an occluded face therewith presenting a sealing surface for selective alignment with an outlet of the moveable sleeve in use, whereby when the moveable sleeve is moved between the valve closed position, whereat the portion of the seal proximate the inlet of the stationary sleeve abuts the outer wall of the moveable sleeve thus preventing fluid from entering the cartridge and whereat the portion of the seal proximate the means to carry an outlet sealing portion of the stationary sleeve abuts the outlet of the moveable sleeve proximate the outer wall by the raised portion and occluded face of said portion thus preventing fluid from exiting the cartridge should the seal proximate the inlet of the stationary sleeve fail, to selective valve opened positions whereat the aperture of the portion of the seal proximate the inlet and outlet of the stationary sleeve overlaps all or part of the inlet and outlet of the moveable sleeve, the raised portions abutting the outer wall of the moveable sleeve proximate the inlet and outlet of the moveable sleeve thus allowing fluid to enter and exit the cartridge and whereat the portion of the seal proximate the means to carry an outlet sealing portion of the stationary sleeve has moved partially or totally away from the outlet of the moveable sleeve with the raised portion and occluded face of said portion allowing fluid to exit the cartridge, the laterally raised portions of the seal abutting the housing assisting in the the retention of the seal with the stationary sleeve.

2. The valve of claim 1 wherein said hollow of said moveable sleeve contains a pressure balancing spool.

3. The valve of claim 1 wherein said hollow of said moveable sleeve contains a plug to maintain separate fluid paths through the cartridge.

4. The valve of claim 1 wherein the means to carry an outlet sealing portion of the stationary sleeve is an opening.

5. The valve of claim 1 or 4 wherein the outlet and the means of the stationary sleeve are disposed adjacent one another.

6. The valve of claim 5 wherein when the means is an opening the outlet and the opening together substantially resemble a figure eight.

7. The valve of claim 1 wherein the seal is generally cylindrical in form.

8. The valve of claim 1 wherein the moveable sleeve is moveable either by reciprocation and/or rotation.

9. The valve of claim 1 wherein the laterally raised portions of the seal abutting the housing assisting in the retention of the seal with the stationary sleeve provides a further backup seal for the outlet of the housing when the valve is in the closed position should the raised portions proximate the inlet and outlet of the moveable sleeve fail in use.

10. A compound seal for a valve having a housing, the housing having cold and hot water inlets and at least one outlet, the housing containing a replaceable cartridge having valve actuation means therein, the valve actuation means having cold and hot water inlets and outlet means to allow fluid to interruptibly flow through the valve, the flow being interrupted when the valve actuation means is moved from a valve open position to a valve closed position, the seal comprising a flexible one piece body having disposed therewith first sealing means to interrupt the flow through the inlet of the valve means when the valve actuation means is moved from a valve open position to a valve closed position, the flexible one piece body also having disposed therewith second sealing means to interrupt the flow out of the valve means through the outlet thereof when the valve actuation means is moved from a valve open position to a valve closed position should the first sealing means fail.

11. The structure of claim 10 wherein the housing of the valve contains a mixing chamber proximate the at least one outlet if one is not otherwise provided with the valve.

12. The structure of claim 10 wherein said valve actuation means of said cartridge is a moveable sleeve having an outer wall and disposed within an outer stationary sleeve fixed in position in the housing.

13. The structure of claim 12 further comprising outlet means which are distinct cold and hot water outlets.

14. The structure of claim 12 further comprising outlet means which are at least one outlet.

15. The compound seal of claim 10 wherein the body is of substantially cylindrical form.

16. The compound seal of claim 15 wherein said first sealing means is a raised annular portion extending about an opening of the body.

17. The compound seal of claim 10 wherein the first sealing means engage the valve actuation means.

18. The compound seal of claim 17 wherein the first sealing means engage the valve actuation means proximate the outer wall of a moveable sleeve.

19. The compound seal of claim 10 or 12 wherein the body has an interior wall and a raised annular portion extending about an opening through the body proximate the interior wall thus allowing flow through the valve, the raised annular portion being disposed adjacent a second raised annular portion proximate the interior wall of the body, the second portion surrounding an occluded face for engagement with the outlet means of the valve actuation means.

20. The compound seal of claim 10 wherein the body of the seal has engagement means disposed therewith proximate the housing to ensure that the body is held in position in use.

21. The compound seal of claim 20 wherein the engagement means are raised annular portions.

22. The structure of claim 1, or 9 wherein the occluded face of the outlet sealing portion provides a check means to prevent the backflow of waste effluent through the outlet of the valve.

23. The structure of claim 22 wherein the laterally raised portions of the seal extending to the housing provide a check means to prevent the backflow of waste effluent through the outlet of the valve and complement the action of the occluded face of the outlet sealing portion as a check means.

* * * * *